United States Patent [19]
Hoshi et al.

[11] 3,862,963
[45] Jan. 28, 1975

[54] ADSORBENT FOR OILS
[75] Inventors: Hiroshi Hoshi, Narashino; Keiichi Murakami, Kamakura; Ichinari Maeda, Ichihara; Rinnosuke Susuki, Tokyo, all of Japan
[73] Assignees: Lion Fat & Oil Co.; Idemitsu Kosan Co., Ltd, both of Tokyo, Japan
[22] Filed: Apr. 23, 1973
[21] Appl. No.: 353,472

[30] Foreign Application Priority Data
Apr. 26, 1972 Japan............................ 47-42437
May 1, 1972 Japan............................ 47-51735

[52] U.S. Cl.............. 252/428, 210/502, 210/503, 210/DIG. 21, 260/2.5 R, 260/37 M, 260/37 R, 252/430
[51] Int. Cl.............................................. B01j 1/22
[58] Field of Search.......... 252/428, 430; 260/37 M, 260/37 R, 2.5 R; 210/502, 503, DIG. 21

[56] References Cited
UNITED STATES PATENTS
3,562,153 2/1971 Tully et al...................... 252/430 X
3,696,051 10/1972 McGuire et al................. 252/430 X

*Primary Examiner*—Paul F. Shaver
*Attorney, Agent, or Firm*—Woodhams, Blanchard and Flynn

[57] ABSTRACT

An adsorbent for oils which is made of a foam substance consisting of 5 – 90 percent by weight of a synthetic resin insoluble in water as well as the oil and 10 – 95 percent by weight of an inorganic filler and having a bulk density of less than 1.

6 Claims, 3 Drawing Figures

ADSORBENT FOR OILS

BACKGROUND OF THE INVENTION a. Field of the Invention

The present invention relates to an adsorbent made of a foam substance, which is suitable for use in collecting oils floating on the surface of the sea as well as fresh waters or waste oils present it city drainage, industrial waste water, etc. and preventing such oils from scattering widely to facilitate cleaning and disposal thereof.

b. Description of the Prior Art

Pollution of the surface of the sea due to heavy oil, the waste oil contained in industrial waste water and so forth is becoming worse year by year, and the destruction of the natural environment for human beings, not to speak of the damage of laver and other fishery products, has become an urgent problem awaiting solution.

As a means for disposing of the oils floating on the surface of water or waste oils, a method of spreading straw-mats on the oily area so that said oils are adsorbed thereby and then burning said straw-mats has hitherto been proposed. According to this method, however, it is impossible to adsorb the oils selectively. There has also been proposed a method of scattering small pieces of foamy polyethylene foam or polystyrene foam processed for insolubility, perlite (foam substance obtained by heating obsidian and the like), etc. on the surface of the sea to make the oils adsorb thereto. According to this method, however, inasmuch as the bulk density of the small pieces of the conventional foam substances is so small that it is overcome by the surface tension of oil, said pieces just skip about on the film of oil, and the oil does not efficiently adsorb thereto. Not only that, there is also a risk that the polystyrene per se will dissolve in the oil, coupled with the trouble that too much carrier water also will be adsorbed.

SUMMARY OF THE INVENTION

A principal object of the present invention is to provide an adsorbent made of a foam substance, which is suitable for effectively adsorbing oils thereto. Another object of the present invention is to provide an adsorbent capable of making extremely small the quantity of the carrier water adsorbed at the time of adsorbing oils. A further object of the present invention is to provide an adsorbent which can be manufactured at a relatively low cost. Accordingly, the adsorbent under the present invention is characterized by the features that: (a) it is not hydrophilic but rather is oleophilic, and it is insoluble not only in water but also in the oil to be adsorbed thereto; (b) it has a bulk density of less than 1 and is floatable on the surface of the water; (c) it is hard to electrify; (d) it is easy to handle and dispose of after collection of the oils; and (e) it is not expensive even when used in a great quantity. Though all the foregoing characteristics (a) - (e) are of course prerequisites to the accomplishment of the object of the present invention, the condition (a) is important for the purpose of selectively adsorbing the oils without adsorbing water, the condition (b) is indispensable to prevent the adsorbent from sinking under water, and the condition (c) is important for making it easy to handle a large quantity of the adsorbent.

To be precise, the adsorbent under the present invention is made of a foam substance consisting of 5 – 90 percent by weight of a synthetic resin insoluble in water as well as oils and 10 – 95 percent by weight of an inorganic filler and having a bulk density of less than 1. The foam substance for use in the present invention is employed in the form of sheets or particles. The oil to be disposed of by means of the foam substance according to the present invention includes (1) crude oil, heavy oil or fish oil floating on the surface of the sea as set forth above, (2) crude oil suspended in the seawater utilized as the ballast for ships, and (3) crude oil contained in the sea-water utilized on the occasion of purging crude oil from the pipe connecting the sea berth for petroleum with the tank on shore. Further, lubricating oil mixed in the waste water discharged from gas stations and so forth may also be the object to be disposed of.

BRIEF DESCRIPTION OF THE DRAWING

In the appended drawings.

DETAILED DESCRIPTION OF THE INVENTION

The composition to be employed in preparing the adsorbent under the present invention is, for instance, as follows. That is, 5 – 90 percent by weight of a synthetic resin comprising at least one member selected from the group consisting of polyethylene, polypropylene and ethylene-vinyl acetate copolymer, and which is insoluble as a whole in water as well as the oil to be adsorbed thereto, is mixed with 10 – 95 percent by weight of at least one kind of inorganic filler such as calcium sulfite, gypsum, calcium carbonate, silica and talc, and the resulting mixture is kneaded together with 0.5 – 10 parts by weight of a conventional blowing agent such as benzene sulfonyl hydrazide and diazo carbonyl amide and a proper quantity of an appropriate cross-linking agent such as t-butyl peroxy isopropyl benzene. Subsequently, the thus prepared composition is formed into a foam material having a bulk density of less than 1, usually in the range of 0.05 – 0.8, and preferably in the range of 0.1 – 0.8. The thus obtained foam material is well applicable as it is as an adsorbent, but, from the view point of convenience for transportation or mode of use thereof, it is preferable to shape it into sheets, particles and the like.

Figure 1:
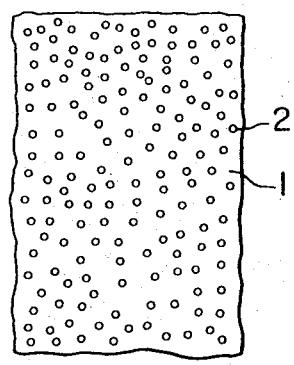
FIG. 1 is a plan view of one embodiment of the present invention wherein the adsorbent is formed in the shape of a sheet.
Figure 2:
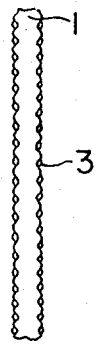
FIG. 2 is a side view of another embodiment of the present invention.
Figure 3:
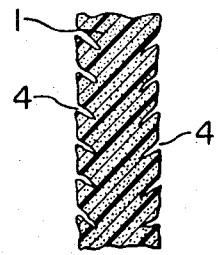
FIG. 3 is a cross-sectional view - on an enlarged scale - of still another embodiment of the present invention.

In the case of forming the foregoing composition into a sheet-type foam material, in order to enhance the oil adsorbability of said sheet, it is desirable not only to enlarge its surface area by making the surface rough or making any pores therein, but also to adopt a construction provided with portions having rifts (which cleavages are to be left intact) or meshes on the surface of said sheet to facilitate adhesion and retention of oils. In the appended drawings illustrative of the sheet-type adsorbent under the present invention, FIG. 1 is a plan view of a sheet prepared by making many pores in the sheet 1 of foamy material, FIG. 2 is a side view of a sheet prepared by forming many protuberances on the surface of said sheet 1, and FIG. 3 is a cross-sectional side view, on an enlarged scale, of a sheet prepared by providing the fissures 4 on the surface of sheet for the purpose of enlarging the surface area as well as facilitating adhesion and retention of the oil thereon.

In this connection, the thickness of the sheet ranges from 0.1 mm for a thin one to 10 mm or 20 mm or thereabouts. The size of the sheet may be determined optionally, but it will be convenient for handling at the time of manufacturing, carrying, disposing of floating oils, etc. to regulate it to be, say, 900 mm × 1,800 mm.

Meanwhile, in the case forming the foregoing composition into a granular foamy material, it suffices to crush the molded foamy substance into an appropriate particle size. The appropriate particle size is in the range of about 1 – 30 mm. The compounding ratio of the inorganic filler in said composition in this case is also in the range of 10 – 95 percent by weight, preferably 40 – 90 percent by weight. Mixing of a relatively large quantity of inorganic filler facilitates mechanical treatment such as the crushing work, rendering it easy to obtain a granular material having a desired particle size. Besides, the thus obtained granular material can be effectively prevented from getting electrified, so that it is easy to scatter. Moreover, by varying the quantity of the filler, the bulk density can be selected as will to ensure sufficient contact between the floating oils and the adsorbent. It goes without saying that the higher is the compounding ratio of the inorganic filler, the lower becomes the production cost of the adsorbent.

The foam material or adsorbent under the present invention is supposed to be thrown down or scattered on the surface of the water whereon the oils are floating, recovered after making said oils adsorb and adhere thereto, pressed with a roll and the like to squeeze out the adsorbed and adhering oils therefrom, and reused or burned up thereafter. On this occasion, it is capable of adsorbing oils in amounts of from two to three times as much as the adsorbent by weight. In the case where the adsorbent under the present invention is of sheet-shape, it not only is convenient for handling at the time of initial laying and recovering but also renders satisfactory adsorption and adhesion of oils by virtue of the provision of portions having pores, cuts and the like for enlarging the surface area and portions having rifts, meshes and the like for facilitating the adhesion and retention of oils, and, as a result, collection of the floating oils by adsorption can be effectively carried out. And, in the case where the adsorbent under the present invention is granular, the granular materials carrying oils adsorbed thereto come to be interconnected to some extent so as to form a block in such a way as to facilitate the recovery work. Besides, by passing the industrial waste water, city drainage, etc. containing the oils through a packed column prepared by filling a vessel with the present granular adsorbent, it is possible to separate said oils selectively.

DESCRIPTION OF THE PREFERRED EMBODIMENTS

Example 1

| | | | |
|---|---|---|---|
| polypropylene | 10% | by weight | |
| ethylene-vinyl acetate copolymer | 30% | do. | 100 parts |
| calcium sulfite | 30% | do. | |
| calcium carbonate | 30% | do. | |
| benzene sulfonyl hydrazide | | | 2 parts |
| t-butyl peroxy isopropyl benzene | | | 0.15 part |

A mixture having the above composition was foamed by heating at 180°C for 20 minutes, whereby a white sheet-type foam material having B.D (bulk density) of 0.2 and a thickness of 2 mm was obtained. When a piece of said sheet-type foam material of a size of 1 square meter (weight: 0.4 Kg) was thrown into a water tank wherein the surface of the water had been covered all over with heavy oil, and then the piece was pulled up, and measured, it weighed 1.4 Kg and was black-colored as a result of adsorption of 1 Kg of heavy oil. When this sheet was burned, it was easy to burn it completely, leaving but a small amount of ash.

Example 2

By crushing the white sheet-type foam material obtained in Example 1 with a mechanical hammer, a granular material having a grain size of approximately 1 – 2 mm was obtained. When 1 Kg of this granular material was thrown into a water tank wherein the surface of the water had been covered all over with heavy oil, and then the granular material was pulled up, and measured, it weighed 4 Kg and was black-colored as a result of adsorption of heavy oil.

Example 3

| | | | |
|---|---|---|---|
| Medium/low pressure polyethylene | 50% | by weight | 100 parts |
| calcium carbonate | 50% | do. | |
| diazo carboxyl amide | | | 5 parts |
| t-butyl peroxy isopropyl benzene | | | 0.3 part |

A mixture having the above composition was foamed by heating at 190°C for 13 minutes, whereby a sheet-type foam material having B.D of 0.3 and a thickness of 3 mm was obtained. When a piece of said sheet-type foam material of a size of 1 square meter (weight: 1.3 Kg) was thrown into 10 Kg of heavy oil, then pulled up, and measured, it weighed 6 Kg.

When this oil-carrying sheet was pressed with a roll to squeeze out the adsorbed oil from it and the thus squeezed sheet (weight: 2.0 Kg) was reused under the same condition as above, it was possible to adsorb and collect 3 Kg of heavy oil anew.

Example 4

By crushing the sheet-type foam material obtained in Example 3 with a mechanical hammer, a granular material having a grain size of approximately 2 – 3 mm was obtained. When 1 Kg of this granular material was thrown into 5 Kg of heavy oil, then pulled up, and measured, it weighed 4.3 Kg.

Example 5

| | | | |
|---|---|---|---|
| ethylene-vinyl acetate copolymer | 60% | by weight | 100 parts |
| gypsum | 40% | do. | |
| benzene sulfonyl hydrazide | | | 5 parts |
| t-butyl peroxy isopropyl benzene | | | 0.2 part |

A mixture having the above composition was foamed by heating at 180°C for 20 minutes, whereby a plate-shaped foam material having B.D of 0.1 was obtained. Subsequently, by crushing this plate-shaped foam material with a shear-type crusher, a granular material having a grain size of approximately 1 – 3 mm was obtained.

When 10 Kg of this granular material was scattered over approximately 100 meters square of sea area, recovered thereafter, and examined, said granular material was stained darkly. When it was measured after shaking the adhering water from its surface, it weighed 20 Kg.

Example 6

| polyethylene | 20% | by weight | 100 |
| ethylene-vinyl acetate copolymer | 15% | do. | |
| calcium sulfite | 60% | do. | parts |
| diazo carbonyl amide 1,3-bisbenzene | | | 2 parts |
| t-butyl peroxy isopropyl benzene | | | 0.15 part |

A mixture having the above composition was foamed by heating at 180°C for 20 minutes, whereby a plate-shaped foam material having B.D of 0.2 was obtained. Subsequently, by crushing this plate-shaped foam material with a crusher, a granular material having a grain size of approximately 1 – 4 mm was obtained.

When 10 Kg of this granular material was scattered over approximately 100 meters square of the sea area whereon heavy oil had been spread, was recovered thereafter, and was measured after shaking the adhering water from its surface, it weighed 25.5 Kg.

What is claimed is:

1. An adsorbent for oils, comprising a foamed substance having a bulk density of less than 1 and consisting essentially of 5 to 90 percent by weight of at least one synthetic resin insoluble in water and oil and selected from the group consisting of polyethylene, polypropylene and ethylene-vinyl acetate copolymer, and 10 to 95 percent by weight of at least one inorganic filler selected from the group consisting of calcium sulfite, gypsum, calcium carbonate, silica and talc.

2. An adsorbent as defined in claim 1, wherein said foamed substance is in the form of a sheet.

3. An adsorbent as defined inn claim 1, wherein said foamed substance is in the form of a sheet provided with many pores, cuts or protuberances on its surface.

4. An adsorbent as defined in claim 1, wherein said foamed substance is in the form of particles.

5. An adsorbent for oils as claimed in claim 1, having a bulk density in the range of 0.1 to 0.8.

6. An adsorbent for oils as claimed in claim 1, containing 40 to 90 percent by weight of said filler.

* * * * *